(No Model.)

I. M. SCOTT.
FLANGE CONNECTION.

No. 245,403.  Patented Aug. 9, 1881.

Witnesses
Geo. H. Strong
Frank A. Brooks

Inventor
Irving M. Scott
By Dewey & Co.
Attys

United States Patent Office.

IRVING M. SCOTT, OF SAN FRANCISCO, CALIFORNIA.

FLANGE-CONNECTION.

SPECIFICATION forming part of Letters Patent No. 245,403, dated August 9, 1881.

Application filed May 19, 1881. (No model.)

*To all whom it may concern:*

Be it known that I, IRVING M. SCOTT, of the city and county of San Francisco, State of California, have invented an Improvement in Flange-Connections; and I hereby declare the following to be a full, clear, and exact description thereof.

My invention relates to an improved flange-connection for joining the ends of pipes; and it consists in providing the ends of the pipes with peculiarly-shaped flanges and securing them with peculiarly-shaped bolts, all of which will hereinafter be more fully explained.

Pipes are ordinarily connected by bolts driven through simple flanges, and the bolt-holes in each have to correspond. This is inconvenient when a length of pipe has to be connected with one already in place, because its position may render it impossible to make the bolt-holes correspond.

The object of my invention is to provide such an intermediate connection as will permit the pipes to be easily joined in whatever position desirable.

Figure 1:
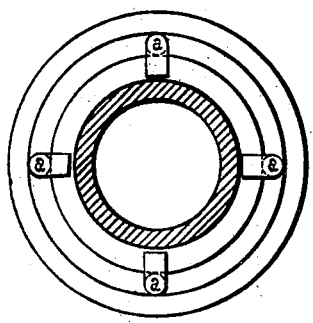
Figure 2:
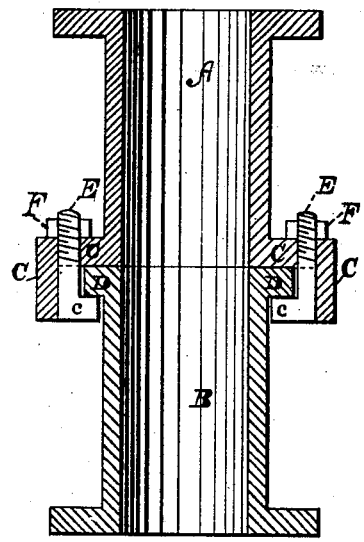

Referring to the accompanying drawings, Figure 1 is a horizontal section. Fig. 2 is a vertical section.

Let A represent one section of a pipe, and B another. The pipe A is provided on one end with a cup-shaped flange, C—that is, one extending outwardly and turned thence at right angles downwardly. The pipe B is provided on one end with a simple projecting flange, D, said flange being narrower than the extended portion of the flange C. These two flanges are fitted together. The upper flange is provided with holes *a*.

E represents bolts. They are provided with screw-threads on one end, and have on the other end a hook or lug, *c*, projecting at right angles. The flange D not being as wide as the flange C, a space is left between its edge and the downwardly-turned portion of the flange C. Through this space the bolts E are passed from below, their screw-heads passing through the apertures *a* in the flange C, and are provided with nuts F on top of the said flange. They are then turned so that their lugs *c* will be turned toward the pipe and fit under the flange D. By tightening up the nuts F the bolts will draw the two flanges tightly together and form a close connection. The bolts, when tightened, will not slip or turn from their positions.

By constructing the different sections of pipe with corresponding flanges, such as are herein described, any length of pipe may be made.

The pipes can be readily disconnected by loosening the nuts F and turning the hook *c* on the bolts from under the flange D.

This form of connection will allow the length of pipe to be carried to any position and connected at any angle with pipes already in place, because either joint can be turned on the other to make the pipe fit the proper connection.

I am aware that, broadly, the use of hook-bolts secured to one flange and adapted to be hooked over the other abutting flange are old, and such devices, broadly, I do not claim; but by my specific arrangement I obtain a joint that is guarded against any accidental displacement by the use of an elongated flange covering the hooked portions of the bolts.

Having thus described my invention, what I claim as new, and desire to secure by Letters Patent, is—

A means for connecting and adjusting the meeting ends of pipe-joints, consisting of the perforated cup-shaped flange C, projecting from one of the sections, so as to overlap the narrower flange D of the other section, in combination with the hook-bolts E, whereby the hook-bolts may be turned so as to bind against the flange D and lie flush or countersunk within the projecting flange C, thereby preventing said hook-bolts from working loose through accident or otherwise.

In witness whereof I have hereunto set my hand.

IRVING M. SCOTT.

Witnesses:
 J. H. BLOOD,
 C. D. COLE.